US005249204A

United States Patent [19]

Funderburk et al.

[11] Patent Number: 5,249,204

[45] Date of Patent: Sep. 28, 1993

[54] CIRCUIT AND METHOD FOR PHASE ERROR CORRECTION IN A DIGITAL RECEIVER

[75] Inventors: Dion M. Funderburk; Sangil Park; Garth D. Hillman, all of Austin, Tex.

[73] Assignee: Motorola, Inc., Schaumburg, Ill.

[21] Appl. No.: 743,641

[22] Filed: Aug. 12, 1991

[51] Int. Cl.[5] .......... H04L 27/06

[52] U.S. Cl. .......... 375/97; 375/81; 329/307

[58] Field of Search .......... 375/97, 81, 78, 80, 375/88, 120; 329/304, 306, 307

[56] References Cited

U.S. PATENT DOCUMENTS

| | | | |
|---|---|---|---|
| 4,519,855 | 4/1985 | Lang et al. | 375/97 |
| 4,689,804 | 8/1987 | Srinivasagopalan et al. | 375/120 |
| 4,896,336 | 1/1990 | Henely et al. | 375/97 |
| 4,926,499 | 5/1990 | Kobayashi et al. | 375/97 |
| 4,942,592 | 7/1990 | Leitch et al. | 375/97 |
| 4,947,409 | 8/1990 | Raith et al. | 375/97 |
| 5,062,123 | 10/1991 | Geile et al. | 375/81 |

OTHER PUBLICATIONS

"Introduction to to Motorola C-Quam AM stereo System" published by Motorola, Inc. in 1985; pp. 1 through 11.

*Primary Examiner*—Curtis Kuntz
*Assistant Examiner*—Don N. Vo
*Attorney, Agent, or Firm*—Elizabeth A. Apperley

[57] ABSTRACT

A digital receiver, such as "C-QUAM" receiver (10), has phase error correction. In another form, a software program may be executed by a conventional digital signal processor to also implement phase error correction. A digital input signal is demodulated to form an in-phase and a quadrature component. The in-phase and quadrature components are processed by a digital envelope detector (24) to form a composite signal containing left and right audio channel information. The in-phase component and composite signal are both processed by a reciprocal cosine estimator (28) and a quadrature channel circuit (38) to provide a difference signal also containing left and right audio channel information. The difference signal is input to phase error correction circuitry (16, 22, 26) to estimate a phase error of the digital input signal. The estimated phase error is then used to correct an actual phase error of the digital input signal during demodulation.

20 Claims, 2 Drawing Sheets

CIRCUIT AND METHOD FOR PHASE ERROR CORRECTION IN A DIGITAL RECEIVER

FIELD OF THE INVENTION

This invention relates generally to a communications system, and more particularly to a receiver in a communications system.

BACKGROUND OF THE INVENTION

During transmission of an information signal from a transmitter to a receiver in a communications system, the information signal typically modulates a carrier signal. The information signal may modulate the carrier signal using a wide variety of methods, such as amplitude or frequency modulation. Although the carrier signal is modulated, a phase error component is generally introduced during transmission from the transmitter to the receiver. The phase error component is manifested as an unwanted low frequency signal which distorts the modulated information signal. The phase error is typically a result of non-linearities inherent within either the transmitter or receiver equipment, and atmospheric conditions such as cloud cover.

To correct a modulating information signal which is distorted by a phase error component, the phase error component is typically removed from the information signal using a feedback loop in analog circuitry. Digital solutions used to remove the phase error component may also be implemented. However, digital solutions require the extensive use of memory accesses and interpolation. Therefore, digital phase error correction circuits have been extremely costly to implement in a receiver system.

In an amplitude modulated (AM) stereo system, the amplitude of the carrier signal is typically modulated by the information signal such that a substantial amount of information may be transmitted in a relatively small band of frequencies. As well, stereo information associated with the transmitted signal may also be transmitted within the frequency band. Several systems for transmission and reception of AM stereo information have been developed through industry use. Each system implements a method for providing two audio channels within a predetermined band of frequencies with high quality stero sound and very little interference. However, one of the standards, an AM stereo system which uses quadrature amplitude modulation, is used most often and is, therefore, a de facto industry standard.

An industry standard AM stereo system licensed by Motorola, Inc., under the trademark "C-QUAM" is referred to as a Compatible Quadrature Amplitude Modulation stero system. The "C-QUAM" stereo system typically provides stereophonic information using amplitude modulation for a main information signal, and a quadrature type of phase modulation for a stereo information signal. Quadrature phase modulation is used to separate a composite of a left channel (L) and a right channel (R) of the stereo information signal, and a difference between the left and the right channels, by a phase angle of 90 degrees for transmission. During transmission, an oscillator signal is modulated with the composite of the left channel and the right channel of the stereo information signal, and a quadrature carrier signal is modulated with the difference between the left channel and the right channel. Together, the information carrier signal and the quadrature carrier signal provide a resultant signal. The resultant signal is then passed through a limiter which removes all amplitude modulated components to provide a limited resultant signal. The limited resultant signal is then amplified and input to the transmitter as a carrier signal. The composite of the left and right channels is provided as an audio input to the transmitter. The transmitter then provides the composite of the left and right channels at a carrier frequency with a phase modulation, where the carrier frequency is equal to the oscillator input of the transmitter. A signal broadcast by the transmitter must then be separated into the composite of and the difference between the left channel and the right channel of the stereo information signal at a receiver.

In the "C-QUAM" analog stereo receiver, stereophonic components are extracted from a broadcast signal using standard analog circuits. Typically, the broadcast signal is converted to a pure quadrature information signal, and a quadrature demodulator is then used to extract both the composite and difference of the left and the right channels of the broadcast signal. Before the broadcast signal is input to the quadrature demodulator, the signal must be converted to an original transmitted quadrature signal that contains phase modulation components. To convert the broadcast signal to its original form, the signal must be demodulated with both an envelope detector and with a sideband detector. The signals provided by both the envelope detector and the sideband detector are then compared and the resultant error signal gain modulates the inputs of the sideband detector. For further information on the operation of a "C-QUAM" encoder and receiver, refer to "Introduction to the Motorola "C-QUAM" AM Stereo System" published by Motorola, Inc. in 1985.

Although an analog solution adequately demodulates the broadcast signal and subsequently separates the broadcast signal into a left and a right signal, the signal quality of the broadcast signal is limited by the nature of the analog solution. Particularly, the envelope detector used in the receiver described above is inherently prone to produce various types of distortion, thereby limiting the audio quality of the AM stereo system. As well, in specialized applications such as an automobile, a small acoustic chamber and a highly variable background noise signal adversely affect the audio quality of any stereo signal. Acoustic equalization may be used to compensate for the small acoustic chamber and adaptive noise suppression may be provided to compensate for the background noise. However, both acoustic equalization and noise suppression techniques are very difficult to implement in an analog system.

Additionally, separate receivers must be used for each type of stereo format and function. For example, separate receivers are needed for FM and AM stereo formats. Therefore, a stereo system which requires both FM and AM stereo formats must have two or more receivers depending on the specifications of the system.

Therefore, a need exists for an AM stereo receiver which demodulates a broadcast signal to produce a high quality stereo signal. The stereo receiver should also remove any phase error components which might distort the broadcast signal in a timely and economical manner. A receiver which can support several stereo functions, such as AM and FM stereo is also needed. Additionally, it is desirable to include equalization and adaptive noise suppression techniques in a receiver to respectively compensate for a small acoustic chamber and variable background noise. Other known sound enhancements and effects, such as reverberation, are also desired features to include in any stereo system.

SUMMARY OF THE INVENTION

The previously mentioned needs are fulfilled with the present invention. Accordingly, there is provided, in one form, a circuit and method of operation for phase error correction during demodulation of a digital modulated information signal in a digital receiver. The circuit has a digital demodulation means for providing a demodulated information signal. The digital demodulation means has a first input for receiving a digital modulated information signal with a phase error component and a second input for receiving a carrier signal with an estimated phase error correction component. The circuit also has a phase error detector means for providing a predetermined trigonometric function of the phase error correction component. The phase error detector is coupled to the digital demodulation means for receiving the demodulated information signal. Additionally, the circuit has a new phase error estimate generator coupled to the phase error detector means for receiving the predetermined trigonometric function of the phase error correction component. The new phase error estimate generator provides the phase error correction component. The circuit also has a numerically controlled oscillator which has an input for receiving the phase error correction signal. The numerically controlled oscillator is coupled to the demodulation means for providing the carrier with the estimated phase error correction component. The phase error correction component is then used to correct the phase error component of the digital modulated information signal during demodulation.

In a second form, a compatible quadrature modulated digital stereo receiver is provided which may be implemented in either hardware or software, or a combination thereof. The compatible quadrature modulated digital stereo receiver has a digital demodulation means for providing a demodulated signal with an in-phase component and a quadrature component. The digital demodulation means has a first input for receiving a digital modulated input signal and a second input for receiving a carrier signal with a phase correction component. The compatible quadrature modulated digital stereo receiver also has a filter and decimation means coupled to the digital demodulation means for providing a decimated signal with an in-phase information component and a quadrature information component. A digital envelope detector means for providing a composite channel signal is also provided by the compatible quadrature modulated digital stereo receiver. The digital envelope detector means is coupled to the filter and decimations means and has a first input for receiving the in-phase information component and a second input for receiving the quadrature information component. The compatible quadrature modulated digital stereo receiver also has quadrature channel means for providing a modified channel difference signal containing the quadrature information component and a phase correction information component. The quadrature channel means is coupled to the filter and decimation means for receiving the quadrature information component, and is coupled to the digital envelope detector means for receiving the composite channel signal. The compatible quadrature modulated digital stereo receiver also has a phase error detector means for providing a predetermined trigonometric function of the phase signal. The phase error detector is coupled to the quadrature channel means for receiving the phase signal containing both the quadrature information component and the phase correction component. Additionally, the compatible quadrature modulated digital stereo receiver has a phase error estimator means for providing the phase correction signal. The phase error estimator is coupled to the phase error detector means for receiving the predetermined trigonometric function of the phase signal.

These and other features, and advantages, will be more clearly understood from the following detailed description taken in conjunction with the accompanying drawing.

Detailed Description of a Preferred Embodiment

The present invention provides a digital circuit and method of operation to correct a phase error component of a modulated input signal in an economical and timely manner. The digital circuit and method of operation described herein corrects the phase error component of the modulated input signal without the use of excessive memory accesses or interpolation.

Figure 1:
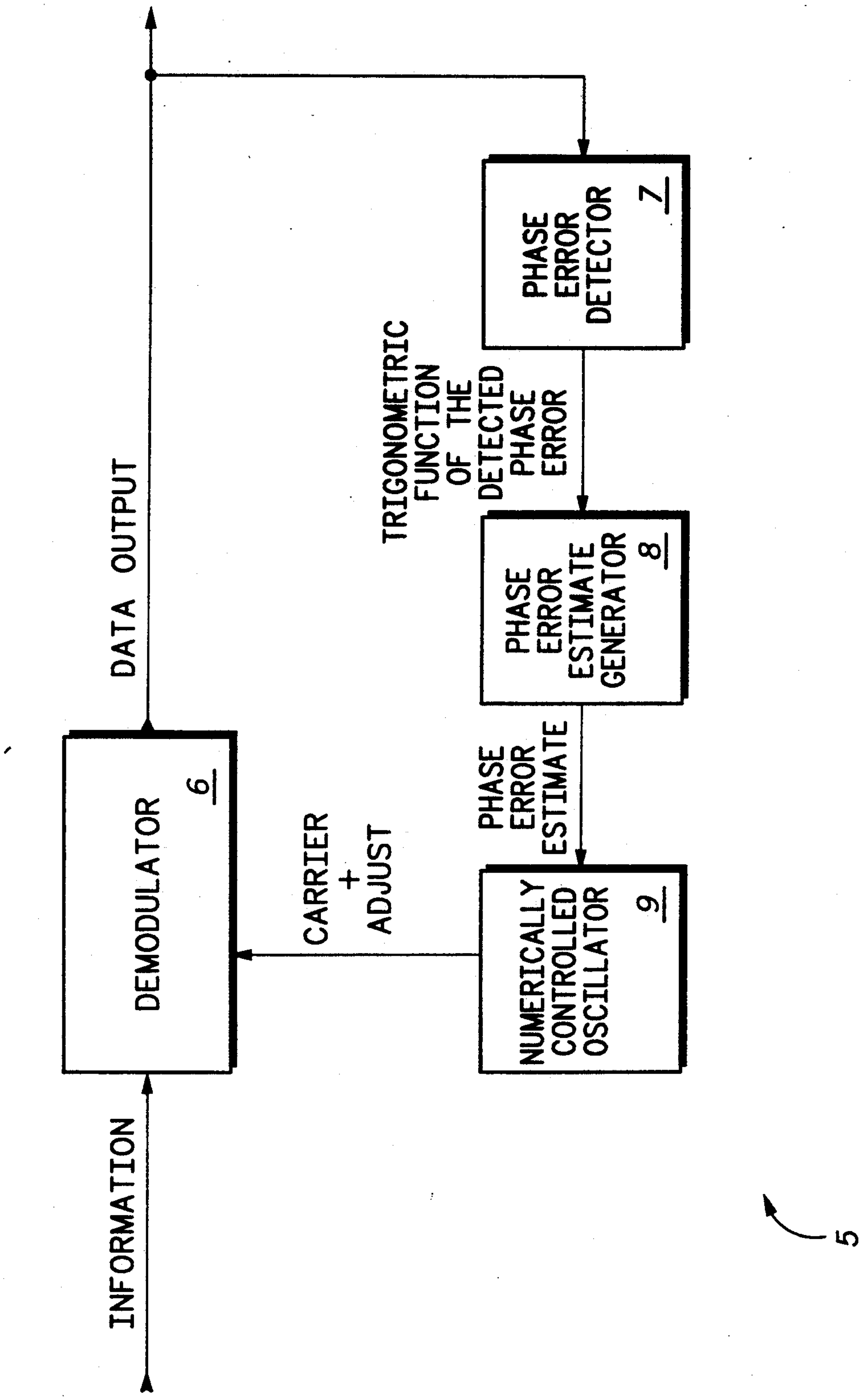
FIG. 1 illustrates in block diagram form a phase error correction circuit in accordance with the present invention.

Illustrated in FIG. 1 is an implementation of a digital circuit 5 for correcting the phase error in a digital receiver in accordance with the present invention. Digital circuit 5 generally has a demodulator 6, a phase error detector 7, a phase error estimate generator 8, and a numerically controlled oscillator 9.

A digital modulated information signal labelled "Information" is provided to digital circuit 5 by a transmitter (not shown). The Information signal is provided to a first input of demodulator 6. A second input of demodulator 6 receives a signal labelled "Carrier+Adjust." Demodulator 6 then provides a signal labelled "Data Output." The Data Output signal is provided to an external user of the digital circuit 5 and to the phase error detector 7.

An output of phase error detector 7 is a trigonometric function of a phase error component of the Data Output signal. The trigonometric function of the detected phase error component is provided to an input of phase error estimate generator 8. Subsequently, phase error estimate generator 8 provides a signal labelled "Phase Error Estimate" to an input of numerically controlled oscillator 9. Subsequently, numerically controlled oscillator 9 provides the Carrier+Adjust signal to the second input of demodulator 6.

It should also be appreciated that a software program may be executed within a digital signal processor (not shown) to provide all or part of the implementation of digital circuit 5 for correcting the phase error in a digital receiver in accordance with the present invention. In the example described herein, digital circuit 5 may be implemented using a digital signal processor such as a Motorola DSP56001 to execute the software program. Other digital signal processors currently available may also be used to implement the digital circuit 5, however.

During operation, the modulated digital signal labelled "Information" is provided to the first input of the demodulator 6. The Information signal is typically an analog signal which has been translated to lower frequency, converted by an analog to digital converter (not shown) to a digital signal, and has been provided to digital circuit 5 for correcting the phase error.

As previously mentioned, transmission of the Information signal results in a modification of the phase angle of the Information signal. Any phase angle modifications must be approximated and corrected before the signal is output to a user of the receiver, or the signal will sound distorted. Therefore, to enable the receiver to provide a quality output signal, modifications to the phase angle of the Information signal must be detected and corrected before being provided to the user.

Demodulator 6 demodulates the Information signal to provide an output signal labelled "Data Output". The Data Output signal provides audio information to a user of digital circuit 5 and phase error information to phase error detector 7.

As mentioned above, the phase error which occurs during transmission of the Information signal is typically due to atmospheric conditions or receiver non-linearities. Both atmospheric conditions and receiver non-linearities generally modify the phase of the Information signal with a low frequency signal. Therefore, phase error detector 7 is used to filter the low frequency signal from the Data Output signal to provide the Detected Phase Error signal. Because the Detected Phase Error signal is periodic, a trigonometric function of the low frequency phase error signal is provided to the phase error estimate generator 8. The filtering operation performed by phase error detector 7 may be executed using standard and conventional logic circuitry or a portion of the predetermined software program mentioned above.

Phase error estimate generator 8 then arithmetically manipulates the trigonometric function of the Detected Phase Error signal to provide the Phase Error Estimate signal to the numerically controlled oscillator 9. An example of the arithmetic manipulation performed by phase error estimate generator 8 will be presented in subsequent text.

Numerically controlled oscillator 9 then uses the Phase Error Estimate signal to provide the Carrier+Adjust signal to correct the phase error component of the Information signal. The Carrier+Adjust signal provides a carrier signal with a phase angle equal to a new phase error estimate value provided by the Phase Error Estimate signal. The new phase error estimate value closely estimates the phase error which modifies the Information signal. Subsequently, the Information signal is demodulated and the phase error component is iteratively corrected by demodulator 6.

In one implementation, the present invention has several advantages over existing analog compatible quadrature amplitude modulation, "C-QUAM", stereo system receivers. The present invention provides a high quality digital stereo sound from an amplitude modulated information signal by implementing a digital "C-QUAM" stereo system. The digital "C-QUAM" stereo system taught herein permits a universal stereo system which supports both FM and AM stereo systems. As well, acoustic equalization and adaptive noise suppression techniques may be readily added to the present invention. Other sound enhancements, such as reverberation, may easily be included as features to improve the quality of the sound of the AM stereo system taught herein. As well, the invention described herein provides a digital circuit and method for correcting a phase error component of a modulated information signal without additional software or hardware as is typically required by look-up tables and interpolation routines. Although discussed below in the context of a digital "C-QUAM" stereo system, the present invention may be implemented in communication systems ranging from a modem to any receiver system.

Figure 2:
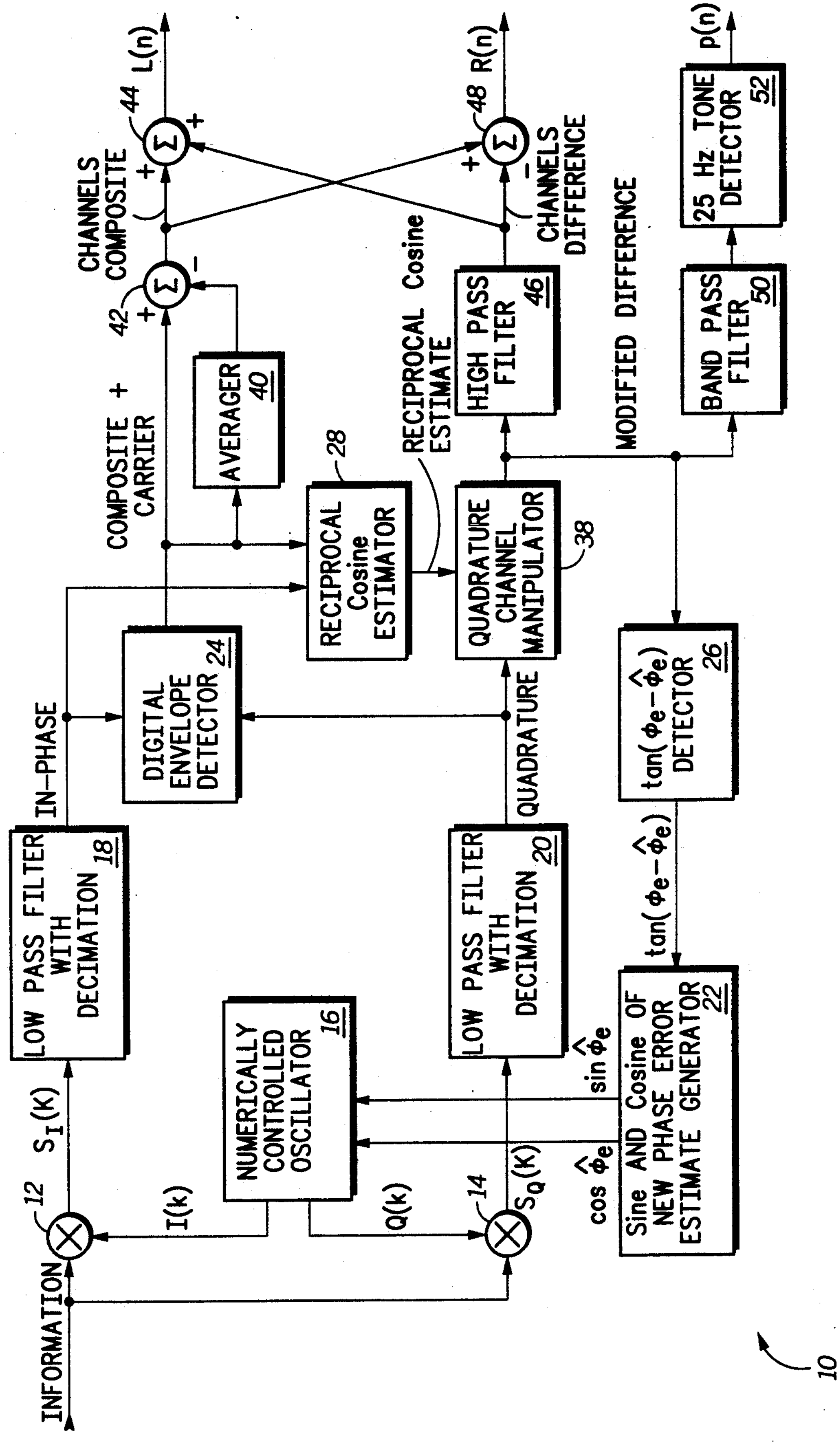
FIG. 2 illustrates in block diagram form a compatible quadrature modulated digital stereo receiver with phase error correction in accordance with the present invention.

Illustrated in FIG. 2 is an implementation of a "C-QUAM" stereo receiver system 10 in accordance with the present invention. The "C-QUAM" stereo receiver has a first multiplier 12, a second multiplier 14, a numerically controlled oscillator 16, a first low pass filter with decimation 18, a second low pass filter with decimation 20, a new phase error estimate generator 22, a digital envelope detector 24, a tan $(\phi_e-\phi_e)$ detector 26, a reciprocal cosine estimator 28, a quadrature channel manipulator 38, an averager 40, an adder 42, an adder 44, a high pass filter 46, an adder 48, a band pass filter 50, and a 25 Hz tone detector 52. In the implementation described herein, the new phase error estimate generator 22, the tan $(\phi_e-\phi_e)$ detector 26, and the numerically controlled oscillator 16 are used to digitally correct the phase error component of the modulated information signal.

A digital modulated information signal labelled "Information" is provided to the receiver system 10 by a "C-QUAM" transmitter (not shown). The Information signal is provided to a first input of both multiplier 12 and multiplier 14. A cosine value of a phase error signal is labelled "I(k)" and is provided to a second input of multiplier 12. Similarly, a sine value of the phase error signal is labelled "Q(k)" and is provided to a second input of multiplier 14.

An output of multiplier 12 is labelled $S_I(k)$ and provides an in-phase component of the modulated information signal as an input to the low pass filter with decimation 18. Low pass filter 18 decimates the $S_I(k)$ signal to provide an output signal labelled "In-phase." The In-phase signal is provided as a first input to both digital envelope detector 24 and reciprocal cosine estimator 28.

An output of multiplier 14 is labelled $S_Q(k)$ and provides a quadrature component of the modulated information signal as an input to the low pass filter with decimation 20. Low pass filter 20 decimates the $S_Q(k)$ signal to provide an output labelled "Quadrature." The Quadrature signal is provided as a second input to the digital envelope detector 24 and a first input to the quadrature channel manipulator 38.

Digital envelope detector 24 provides a signal labelled "Composite+Carrier." The "Composite+Carrier" signal is provided as a second input to the reciprocal cosine estimator 28, as an input to averager 40, and as a first input to adder 42. An output of reciprocal cosine estimator 28 is labelled "Reciprocal Cosine Estimate" and provides a second input to the quadrature channel manipulator 38. An output of averager 40 provides a second input to adder 42. An output of adder 42 is labelled "Channels Composite" and provides a first input to both adder 44 and adder 48.

An output of quadrature channel manipulator 38 is labelled "Modified Difference" and provides an input to high pass filter 46, to band pass filter 50 and to tan $(\phi_e-\phi_e)$ detector 26. An output of high pass filter 46 provides a signal labelled "Channels Difference" to a second input of both adder 44 and adder 48. An output of adder 44 is a signal labelled "L(n)" and an output of adder 48 is a signal labelled "R(n)." Both the L(n) and R(n) signals are provided to an external user of "C-QUAM" receiver system 10. An output of band pass filter 50 provides an input to 25 Hz tone detector 52. An output of 25 Hz tone detector 24 provides an output labelled "p(n)" to an external user of "C-QUAM" receiver system 10.

An output of the tan $(\phi_e-\hat{\phi_e})$ detector 26 is provided to an input of the new phase error estimate generator 22. New phase error estimate generator 22 provides a signal labelled "cos $\hat{\phi_e}$" to a first input of numerically controlled oscillator 16. Similarly, new phase error estimate generator 22 provides a signal labelled "sin $\hat{\phi_e}$" to a second input of numerically controlled oscillator 16. Numerically controlled oscillator 16 subsequently provides a cosine of a signal reflecting an adjusted phase error to the second input of multiplier 12 and a sine of the signal reflecting the adjusted phase error to the second input of multiplier 14.

In the implementation of the invention described above, multipliers 12 and 14 serve to digitally demodulate the Information signal. Similarly, reciprocal cosine estimator 28 and quadrature channel manipulator 38 collectively function to form the Modified Difference signal containing the difference between a left and a right audio information signal. Additionally, new phase error estimate generator 22 and numerically controlled oscillator 16 collectively estimate and correct a phase error of the Information signal.

A software program may be executed within a digital signal processor (not shown) to provide a fully digital implementation of "C-QUAM" digital signal receiver in accordance with the present invention. In the example described herein, stereo receiver system 10 may be implemented using a digital signal processor such as a Motorola DSP56001. Other digital signal processors currently available may also be used to implement the stereo receiver system 10, however.

During operation, a modulated digital signal labelled "Information" is provided to the first input of both multiplier 12 and multiplier 14. The Information signal is typically an analog signal which has been translated to lower frequency, converted by an analog to digital converter (not shown) to a digital signal, and has been transmitted by a "C-QUAM" transmitter (not shown) to receiver system 10. The Information signal is typically characterized by the following equation:

$$\text{Information} = \left[C + L(k) + R(k)\cos\left(\frac{\omega_c}{\omega_s}k + \gamma(k) + \phi_e(k)\right)\right]. \quad (1)$$

In equation (1), C is a constant value equal to a carrier magnitude of the Information signal, L(k) indicates the magnitude of a left audio channel signal at a predetermined dimensionless time index (k), and R(k) indicates the magnitude of a right audio channel signal at a same predetermined time index (k). An angular center frequency of the Information signal is equal to $\omega_c$ and an angular sampling frequency of the Information signal is equal to $\omega_s$. The value (k) is also provided to indicate the time index of the ratio of the angular center frequency to the angular sampling frequency. A quadrature information signal is reflected in equation (1) by the term $\gamma$, and a phase error information component is represented by the $\phi_e$ term. The quadrature information term $\gamma$ is expressed in the following form:

$$\gamma = \tan^{-1}\left[\frac{L(k) - R(k) + .05\sin\left(\frac{25}{f_s}\right)2\pi k}{C + L(k) + R(k)}\right], \quad (2)$$

where the term $$\left(.05\sin\left(\frac{25}{f_s}2\pi k\right)\right)$$

is a 25 Hz pilot tone used as a reference signal by any conventional AM stereo receiver.

During transmission, a phase angle of an analog signal is altered by surrounding conditions. For example, atmospheric conditions and receiver equipment limitations may modify the phase angle of the transmitted digital signal. Any phase angle modifications must be approximated and corrected before the signal is output to a user of the receiver, or the signal will sound distorted. Therefore, to enable the receiver to provide a quality audio sound, modifications to the phase angle of the analog signal must be detected and corrected before being provided to the user.

Multipliers 12 and 14 demodulate the Information signal to respectively provide an in-phase sampled output signal labelled "$S_I$(k)" and a quadrature sampled output signal labelled "$S_Q$(k)." To provide the $S_I$(k) signal, the Information signal is multiplied with a predetermined first output signal labelled "I(k)" provided by numerically controlled oscillator 16. The I(k) signal typically has the form of:

$$I(k) = \cos\left(\frac{\omega_c}{\omega_s}k + \hat{\phi_e}(k)\right). \quad (3)$$

The $\phi_e$(k) term of equation (3) provides a phase error correction value necessary to enable receiver system 10 to provide a quality audio signal. Therefore, when multiplier 12 multiplies the Information signal and the I(k) signal, the result is the $S_I$(k) signal in the form of:

$$S_I(k) = \left[(C + L(k) + R(k))\cos\left(\frac{\omega_c}{\omega_s}k + \gamma(k) + \hat{\phi_e}(k)\right)\right] \times \left[\cos\left(\frac{\omega_c}{\omega_s}k + \phi_e(k)\right)\right], \quad (4)$$

which simplifies to equation (5):

$$S_I(k) = \tfrac{1}{2}[C(1+L(k)+R(k))\cos[(\gamma(k)+(\phi_e-\hat{\phi_e})]] + D(k), \quad (5)$$

where D(k) is a double frequency term.

Similarly, to provide the $S_Q$(k) signal, the Information signal is multiplied with a predetermined second output signal labelled "Q(k)" provided by numerically controlled oscillator 16. The Q(k) signal typically has the form of:

$$Q(k) = -\sin\left(\frac{\omega_c}{\omega_s} k + \hat{\phi}_e(k)\right). \quad (6)$$

Therefore, when multiplier 14 multiplies the Information signal to the Q(k) signal, the result is the $S_Q(k)$ signal in the form of:

$$S_Q(k) = \left[(C + L(k) + R(k))\cos\left(\frac{\omega_c}{\omega_s} k + \gamma(k) + \phi_e(k)\right)\right] \times \left[-\sin\left(\frac{\omega_c}{\omega_s} k + \hat{\phi}_e(k)\right)\right], \quad (7)$$

which simplifies to equation (8):

$$S_Q(k) = \tfrac{1}{2}[C(1 + L(k) + R(k)) \sin [(\gamma(k) + (\phi_e - \hat{\phi}_e)]] + D(k), \quad (8)$$

where D(k) is the double frequency term.

The $S_I(k)$ and $S_Q(k)$ signals are respectively a demodulated in-phase component and a demodulated quadrature component of the Information signal. The low pass filters with decimation 18 and 20 both remove the double frequency terms, D(k), and lower the sampling frequency of each of the $S_I(k)$ and $S_Q(k)$ signals.

In this example, low pass filters with decimation 18 and 20 filter the double frequency term, D(k) and subsequently decimate the $S_I(k)$ and $S_Q(k)$ input signals by four, respectively. During decimation, the $S_I(k)$ and $S_Q(k)$ input signals are sampled at a frequency which is a fraction of the input frequency of the signals. For example, when the low pass filter with decimation 18 decimates by four, the $S_I(k)$ signal is sampled at a frequency which is one-fourth the frequency at which the $S_I(k)$ signal is input to the low pass filter with decimation 18. Therefore, a signal output from each one of the low pass filters with decimation 18 and 20 has a sampling frequency which is one-fourth of the frequency at which the signal was input.

Low pass filter with decimation 18 provides a signal labelled "In-phase" to an input of both digital envelope detector 24 and reciprocal cosine estimator 28. The In-phase signal has the form:

$$\text{In-phase} = \tfrac{1}{2}[(C + L(n) + R(n)) \cos ((\gamma(n) + (\phi_e - \hat{\phi}_e))]. \quad (9)$$

As shown in equation (9), low pass filter with decimation 18 removes the double frequency term D(k) from the $S_I(k)$ signal. As well, the decimation is reflected by a new time index, n, where n is equal to (k/4). Therefore, the $S_I(k)$ signal given by equation (5) is provided without the double frequency term D(k) and at a lower sampling frequency. Low pass filter with decimation 18 may be implemented by using a standard low pass digital filter with a decimation process. The standard low pass digital filter with the decimation process may be digitally implemented as a series of conventional software instructions which is executed in the data processor.

Similarly, low pass filter with decimation 20 provides a signal labelled "Quadrature" to both an input of digital envelope detector 24 and an input of quadrature channel manipulator 38. The Quadrature signal has the form:

$$\text{Quadrature} = \tfrac{1}{2}[(C + L(n) + R(n)) \sin ((\gamma(n) + (\phi_e - \hat{\phi}_e))]. \quad (10)$$

As shown in equation (10), low pass filter with decimation 20 removes the double frequency term D(k) from the $S_Q(k)$ signal. As well, the decimation is also reflected by the new time index, n, where n is equal to (k/4). Therefore, the $S_Q(k)$ signal given by equation (8) is provided without the double frequency term D(k) and at a lower sampling frequency. Like low pass filter 18, low pass filter with decimation 20 may be implemented by using a standard low pass digital filter with a decimation process. Similarly, the standard low pass digital filter with the decimation process may be digitally implemented as a series of software instructions which is executed in the data processor.

The In-phase and the Quadrature signals respectively provide demodulated decimated in-phase and quadrature signals to the remaining portion of the receiver system 10. Both signals are input to digital envelope detector 24 to provide a signal labelled "Composite+Carrier." The value of the "Composite+Carrier" signal is determined from both the In-phase and the Quadrature signals and provides a signal indicating the value of the envelope of the Information signal. The "Composite+Carrier" signal has the form:

$$\text{Composite} + \text{Carrier} = \sqrt{\text{In-phase}^2(n) + \text{Quadrature}^2(n)}. \quad (11)$$

By using commonly known trigonometric identities, equation (11) may be simplified to provide the "Composite+Carrier" signal with the form:

$$\text{Composite} + \text{Carrier} = \tfrac{1}{2}(C + L(n) + R(n)). \quad (12)$$

The digital envelope detector 24 uses a conventional multiplier circuit (not shown) to compute the square values of the In-phase and the Quadrature signals, a conventional adder circuit (not shown) to add the squares of the In-phase and the Quadrature signals, and a conventional circuit to compute the square root of the composite of the squares of the In-phase and the Quadrature signals. The multiplier circuit, the adder, and the circuit to compute the square root are typically resident in the data processor, and therefore, a software program to enable the data processor to execute the operation performed by the digital envelope detector 24 may be easily implemented.

The output of the digital envelope detector 24, the "Composite+Carrier" signal, provides the first input to adder 42, the input to averager 40, and the second input to reciprocal cosine estimator 28. Averager 40 uses a software program to enable the data processor to average the "Composite+Carrier" signal. An average of the "Composite+Carrier" signal provides an amplitude of the carrier, or the DC component of the envelope information signal. The output of averager 40 is labelled "Carrier" and has the form of:

$$\text{Carrier}_{new} = \beta\text{Carrier}_{old} + (1 - \beta) \times (\text{Composite} + \text{Carrier}), \quad (13)$$

where $\beta$ is a smoothing parameter determined by a user of the receiver 10. The smoothing parameter $\beta$ should be chosen in such a manner to allow the output of averager 40 to quickly converge on a mostly constant Carrier value which represents the carrier componet of the envelope information signal "Composite+Carrier".

The Carrier value is negated and subsequently added to the envelope information signal "Composite+Carrier" by adder 42 to provide a signal labelled "Channels Composite." The Channels Composite signal is given by the following equation:

$$\text{Channels Composite} = (\text{Composite} + \text{Carrier}) - (\text{Carrier}) = \tfrac{1}{2}[L(n) + R(n)]. \quad (14)$$

The Channels Composite signal contains the composite of information from both the left and right channels of the Information signal. As discussed below, the Channels Composite signal will be manipulated further to provide separate left and right audio information signals to the user of receiver system 10.

To obtain quadrature information from the Information signal input to receiver system 10, a signal containing the difference between the left and right channels must be extracted from the Information signal. Additionally, the phase error generated during transmission of the Information signal must be corrected to provide a quadrature signal with little or no distortion.

It should be noted again that the Quadrature signal of equation (10) contains components which reflect both the left and right channels of the stereo Information signal, and the difference between phase error $\phi_e$ and the phase error correction signal $\hat{\phi}_e$. To determine the left and right channels of the Information signal, equation (10) must be further manipulated. First, however, equation (2) in which γ(n) is equal to the tangent of a predetermined combination of the left and right channels of the Information signal must be rewritten to provide the following relationship:

$$\tan\gamma(n) = \frac{\sin\gamma(n)}{\cos\gamma(n)} = \frac{L(n) - R(n) + p(n)}{C + L(n) + R(n)}, \quad (15)$$

where p(n) is a variable equal to $$.05\sin\left(\frac{25}{f_s}2\pi k\right),$$

the 25 Hz pilot tone for AM stereo.

Next, to obtain the difference between the left and right channels of the Information signal, and the difference between a phase of the Information signal and a phase error correction signal provided by numerically controlled oscillator 16, a modified envelope information signal labelled "Reciprocal Cosine Estimator" must be generated by the reciprocal cosine estimator 28. The Reciprocal Cosine Estimator signal is equal to the "Composite+Carrier" signal divided by the In-phase signal. The division function executed by reciprocal cosine estimator 28 may be implemented as a software program or as a conventional digital divider circuit in a data processor.

When simplified, the Reciprocal Cosine Estimator signal has the form:

$$\text{Reciprocal Cosine Estimator} = \frac{1}{\cos(\gamma(n) + (\phi_e - \hat{\phi}_e))}. \quad (16)$$

The Reciprocal Cosine Estimator signal is then provided as an input to the quadrature channel manipulator 38. The Quadrature signal is also provided as an input to the quadrature channel manipulator 38 to produce a signal labelled "Modified Difference." The quadrature channel manipulator 38 multiplies the Reciprocal Cosine Estimator signal to the Quadrature signal to produce the Modified Difference signal. A product of the multiplication operation executed by quadrature channel manipulator 38 has the form:

$$\text{Modified Difference} = \frac{\frac{1}{2}(L(n) - R(n) + p(n)) + \frac{1}{2}(C + L(n) + R(n))\tan(\phi_e - \hat{\phi}_e)}{(1 - \tan\gamma(n)\tan(\phi_e - \hat{\phi}_e))}. \quad (17)$$

The function performed by the quadrature channel manipulator 38 may be implemented as a software program or as a digital multiplication circuit in the data processor.

The Modified Difference signal is then provided as an input to high pass filter 46, band pass filter 50 and tan($\phi_e - \hat{\phi}_e$) detector 26.

By allowing only frequencies higher than a predetermined level to be output from high pass filter 46, the pilot frequency signal p(n) and the frequency of the tan ($\phi_e - \hat{\phi}_e$) signal are not output from high pass filter 46. Instead, high pass filter 46 provides a signal labelled "Channels Difference" to an input of both adder 44 and adder 48. The Channels Difference signal is characterized by the following equation:

$$\text{Channels Difference} = \tfrac{1}{2}[L(n) - R(n)]. \quad (18)$$

The Channels Difference signal is negated and added to the Channels Composite signal by adder 48 to produce a signal labelled "R(n)." The R(n) signal provides right stereophonic information to a user of receiver 10. Similarly, the Channels Difference signal provides a second input to adder 44. Adder 44 adds the Channels Difference and Channels Composite signals to provide a signal labelled "L(n)." The L(n) signal provides left stereophonic information to the user of receiver system 10.

By allowing only frequencies within a predetermined range of frequencies to be output from band pass filter 50, the in-phase and quadrature information signals and the tan ($\phi_e - \hat{\phi}_e$) information signal are not output from band pass filter 50. Rather, band pass filter 50 allows only the pilot frequency signal p(n) to pass through and be output to the 25 Hz Tone Detector 52. Upon receipt of the p(n) signal, the 25 Hz Tone Detector 52 provides a signal to indicate that the pilot signal p(n) is present.

The phase error which occurs during transmission of the Information signal is typically due to atmospheric conditions or receiver non-linearities. Both atmospheric conditions and receiver non-linearities generally modify the phase of the information signal with a low frequency signal. Therefore, the tan ($\phi_e - \hat{\phi}_e$) detector 26 is basically a low pass filter which detects the phase error inherent in the Information signal. Detector 26 is a conventional low pass digital filter circuit which is digitally implemented as a software program executed by the data processor. The tan ($\phi_e - \hat{\phi}_e$) detector 26 provides a signal labelled "tan ($\phi_e - \hat{\phi}_e$)" to an input of new phase error estimate generator 22. The filtering operation executed by tan $(\phi_e-\hat{\phi_e})$ detector 26 may be executed using standard and conventional logic circuitry controlled by a predetermined software program. A sample of a predetermined software program written for use with a Motorola DSP56001 is provided in Appendix I.

When the new phase error estimate generator 22 receives the tan $(\phi_e-\hat{\phi_e})$ signal, a cosine and sine of a new phase error signal are provided. The cosine and sine of the new phase error signal are respectively labelled "cos $\hat{\phi_e}$" and "sin $\hat{\phi_e}$." To generate the cos $\hat{\phi_e}$ and the sin $\hat{\phi_e}$ signals, the following trigonometric identities are used with the assumption that $x=\tan(\phi_e-\hat{\phi_e})$.

$$\sin(\phi_e-\hat{\phi_e})=\frac{x}{\sqrt{1+x^2}}; \quad (19)$$

and $$\cos(\phi_e-\hat{\phi_e})=\frac{1}{\sqrt{1+x^2}}. \quad (20)$$

Because the values of the cos $\hat{\phi_e}$ and sin $\hat{\phi_e}$ were provided to numerically controlled oscillator 16 during demodulation of the Information signal, the values are known. Therefore, the values may be referred to as $\cos_{old}\hat{\phi_e}$ and $\sin_{old}\hat{\phi_e}$. To provide a new cos $\hat{\phi_e}$ and a new sin $\phi_e$ signal to more closely approximate the phase error of the Information signal, the following equations are solved:

$$\sin_{new}\hat{\phi_e}=\cos(\phi_e-\hat{\phi_e})\sin_{old}\hat{\phi_e}+\sin(\phi_e-\hat{\phi_e})\cos_{old}\hat{\phi_e};\text{ and} \quad (21)$$

$$\cos_{new}\hat{\phi_e}=\cos(\phi_e-\hat{\phi_e})\cos_{old}\hat{\phi_e}-\sin(\phi_e-\hat{\phi_e})\sin_{old}\hat{\phi_e}. \quad (22)$$

$\sin_{new}\hat{\phi_e}$ and $\cos_{new}\hat{\phi_e}$ respectively indicate the value of the new sin $\hat{\phi_e}$ signal and the new cos $\hat{\phi_e}$ signal. The multiplication and addition operations executed by new phase error estimate generator 22 may be executed using standard logic circuitry in the data processor or by a predetermined software program.

The $\cos_{new}\hat{\phi_e}$ and $\sin_{new}\hat{\phi_e}$ signals are then provided to numerically controlled oscillator 16. Numerically controlled oscillator 16 then uses the $\cos_{new}\hat{\phi_e}$ and $\sin_{new}\hat{\phi_e}$ signals to respectively generate a cosine and sine of a demodulation signal used to demodulate the Information signal. Numerically controlled oscillator 16 provides a cosine of the demodulation signal, labelled I(k), to multiplier 12. The cosine of the signal is calculated by the following equation:

$$I(k)=\cos\left(\frac{\omega_c}{\omega_s}(k)+\hat{\phi_e}\right)=\left[\cos\frac{\omega_c}{\omega_s}(k)\cos_{new}(\hat{\phi_e})\right]-\left[\sin\frac{\omega_c}{\omega_s}(k)\sin_{new}\hat{\phi_e}\right]. \quad (23)$$

Similarly, numerically controlled oscillator 16 provides a sine of the signal to multiplier 14. The sine of the demodulated signal, labelled Q(k), is calculated by the following equation:

$$Q(k)=\sin\left(\frac{\omega_c}{\omega_s}(k)+\hat{\phi_e}\right)=\left[\sin\frac{\omega_c}{\omega_s}(k)\cos_{new}(\hat{\phi_e})\right]+\cos\frac{\omega_c}{\omega_s}(k)\sin_{new}\hat{\phi_e}. \quad (24)$$

The multiplication and addition operations executed by numerically controlled oscillator 16 may be executed using standard and conventional logic circuitry or by a predetermined software program in a data processor. A next sample of the Information signal is demodulated with the multipliers 12 and 14, and the phase error of the signal is approximated by numerically controlled oscillator 16. Therefore, the phase angle of the signal is approximated and iteratively converged by calculating the sine and cosine of the phase error. Note that the $\hat{\phi_e}$ term is adjusted only every fourth time numerically controlled oscillator 16 provides an output signal due to the decimation before $\hat{\phi_e}$ is calculated.

Additionally, by carefully choosing the center frequency of the Information signal, the signals output by numerically controlled oscillator 16 may be simplified to an easily usable form when the phase error of the Information signal is equal to zero. By choosing the center frequency of the Information signal such that the ratio between the center frequency and the sample frequency are an integer ratio, the numerically controlled oscillator 16 outputs will exhibit a periodic nature. When the ratio between the center frequency and the sample frequency of the Information signal is an integer value, numerically controlled oscillator 16 provides a cosine and a sine signal, each of which is periodically repeatable when the phase error is equal to zero. For example, assume that the ratio between the center frequency and the sample frequency of the Information signal is $\frac{1}{4}$, and that $\hat{\phi_e}$ is equal to zero. Only four unique values for the cosine signal and only four unique values for the sine signal are output by numerically controlled oscillator 16 due to the periodic nature of cosine and sine signals in general. Because only four unique values are generated for each of the cosine signal and the sine signal, a need for a cosine and sine look-up table and interpolation methods are eliminated. Rather, the four unique values for both the cosine signal and the sine signal may be accessed by incrementing through a circular buffer (not shown) which may be implemented internally within the data processor or with conventional logic circuitry. By using equations (23) and (24), no interpolation and table look-up routines are needed to determine the output of numerically controlled oscillator 16 when the phase error of the Information signal is equal to zero.

There has been provided herein, a circuit for correcting a phase error component of a modulated information signal in a receiver. The new phase error estimate generator 22, the tan $(\phi_e-\hat{\phi_e})$ detector 26, and the numerically controlled oscillator 16 collectively provide a phase error correction circuit which first determines a trigonometric function of the phase error component, and then corrects the phase error component of the modulated information signal. Although implemented in a "C-QUAM" stereo receiver system, the phase error correction circuit described herein may be easily implemented in a wide range of communications systems. For example, the phase error correction circuit may be implemented in a modem, a digital FM stereo receiver, or any application in which data is transferred from one point to another. The steps and functions performed by the phase error correction circuit may also be implemented as a software program.

Additionally, a digital compatible quadrature modulated stereo receiver which provides a high quality stereo information signal has also been provided. The steps and functions performed by the digital compatible quadrature modulated stereo receiver may be implemented as a software program. The software program would be subsequently executed by a digital data processor. In particular, current hardware implementations of digital signal processor devices would adequately support the requirements of the digital "C-QUAM" stereo receiver system 10 described herein.

The "C-QUAM" stereo receiver system 10 also permits several receiver system functions to be implemented as a software program. For example, an AM stereo signal, volume and tone control of the AM stereo signal, acoustic equalization, adaptive noise suppression, and an interface to a Digital Audio Tape (DAT) or a Compact Disk (CD) are all functions which are easily implemented through a software program. In comparison , traditional "C-QUAM" stereo receivers would require additional circuitry to compensate for a equalization and adaptive noise suppression. Therefore, "C-QUAM" stereo receiver system 10 provides a more versatile receiver system which is not limited by the constraints of standard analog equipment. Additionally, "C-QUAM" receiver system 10 would use fewer components than the analog implementation of a traditional "C-QUAM" receiver system. Therefore, the digital implementation of the "C-QUAM" receiver system 10 also has better reliability than the analog implementation of the "C-QUAM" receiver system.

The "C-QUAM" stereo receiver system 10 also allows for a wide variety of sound enhancements to be included as features to improve the quality of the AM stereo sound. For example, reverberation may be included by adding only slight modifications to the software program necessary to control the operation of the "C-QUAM" stereo receiver system 10.

Additionally, the digital implementation of the "C-QUAM" stereo receiver system 10 allows for a universal stereo system. By programming different receivers on the same digital system, several different functions such as AM stereo or FM stereo may be implemented by simply loading a corresponding software program to a digital data processing system. Therefore, the digital "C-QUAM" stereo receiver system 10 provides an economical solution to implement a stereo system which receives both AM and FM stereo signals, and provides for a wide variety of sound enhancements such as equalization and noise suppression.

It should be well understood that the digital "C-QUAM" stereo receiver system described herein provides a wide variety of sound enhancements. The implementation of the invention described herein is provided by way of example only, however, and many other implementations may exist for executing the function described herein. For example, a plurality of software programs may be provided to respectively perform the arithmetic functions executed by each of the components of the receiver system 10. The plurality of software programs are provided by the user of the receiver system 10 and may be executed on any one of a plurality of digital data processors. Additionally, the plurality of software programs may be slightly modified to enable each one of the plurality of digital data processors to perform the arithmetic functions described above.

Each one of the components of the receiver system 10 may be digitally implemented in a software program and executed in a digital data processing system. A series of software instructions would enable multiplier 12, second multiplier 14, numerically controlled oscillator 16, first low pass filter with decimation 18, second low pass filter with decimation 20, new phase error estimate generator 22, digital envelope detector 24, tan $(\phi_e-\phi_e)$ detector 26, reciprocal cosine estimator 28, quadrature channel manipulator 38, averager 40, adder 42, adder 44, high pass filter 46, adder 48, band pass filter 50, and 25 Hz Tone Detector 52 to each perform a respective predetermined function as described herein.

Additionally, the form and content of the software program is dependent on the user of the receiver system 10. The circuitry used to perform the mathematical computations required by the software programs is implemented in a conventional form. Conventional adders, multipliers, and dividers are typically used to implement a software program to perform the functions described herein. Tan $(\phi_e-\phi_e)$ detector 26 might also be implemented as a circuit or software program which would provide any trigonometric function with a linear function for small differences between the estimated phase error signal and the phase error of the Information signal. For example, a sine function detector might also be easily implemented in receiver system 10.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

APPENDIX I

This subroutine performs the function of determining tan $(\phi_e-\hat{\phi}_e)$ with a low pass filter in a Motorola DSP56001 digital signal processor. For further information on the software instructions implemented within the subroutine, refer to "DSP56000/DSP56001 Digital Signal Processor User's Manual, (DSP56000UM/AD)" published by Motorola Inc. in 1989. In FIG. 1, this subroutine is represented by tan $(\phi_e-\hat{\phi}_e)$ detector 26. The input to the detector is the output of the quadrature channel manipulator 38. It is called qstar in this program. The pointers r6 and r7 respectively point to the previous input and output data of the tan $(\phi_e-\hat{\phi}_e)$ detector 26. The terms 1pfr7, 1pfc7, 1pfcddr, and nomod are labels which indicate offset values determined by a user of the DSP56001. The pointer r2 points to coefficients of the low pass filter. The modulo addresses m2, m6, and m7 are determined accordingly.

```
org p:$100
move        y:qstar,y1       ;move the output of the
                             ;quadrature channel
                             ;manipulator 38 into
                             ;register y1
move        x:1pfr6,r6       ;move the location of the
                             ;previous input data into
                             ;pointer r6
move        x:1pfr7,r7       ;move the location of the
                             ;previous output data into
```

-continued

```
                                ;pointer r7
move        x;1pfcddr,r2        ;move the location of the
                                ;filter coefficient into
                                ;pointer r2
move        #1,m6               ;set up modulo addresses
move        m6,m7
move        #nomod, m2
move        x:(r2)+,x0          ;move the first filter
                                ;coefficient into register x0
```

The following five instructions perform the filter, accumulating the result in a register a and incrementing through the coefficients, the old input data and the old output data. On the last instruction, the latest input data is stored to a memory location for use when the next sample is filtered. The output of the filter is moved to register x1, and will then become the input to the new phase error estimate generator 22.

```
mpy     x0,y1,a x:(r2)+,x0      y:(r6)+,y0
mac     x0,y0,a x:(r2)+,x0      y:(r6),y0
mac     x0,y0,a x:(r2)+,x0      y:(r7)+,y0
mac     x0,y0,a x:(r2)+,x0      y:(r7),y0
mac     y0,y0,a                 y1,y:(r6)
```

The final line of code moves the filter to register x1 and moves the new output into the new output memory for use on the next sample to be filtered.

```
move    a,x1                    a,y:(r7)
```

We claim:

1. A compatible quadrature modulated digital stereo receiver, comprising:

digital demodulation means for demodulating a digital modulated input signal to provide an in-phase signal and a quadrature signal, the digital demodulation means having a first input for receiving the digital modulated input signal and a second input for receiving a phase error correction signal;

filter and decimation means coupled to the digital demodulation means for providing a decimated in-phase signal and a decimated quadrature signal;

digital envelope detector means for providing a composite channel signal, the digital envelope detector means being coupled to the filter and decimation means and having a first input for receiving the decimated in-phase signal and a second input for receiving the decimated quadrature signal;

quadrature channel means for providing a modified difference signal containing the decimated quadrature signal and the phase error correction signal, the quadrature channel means being coupled to the filter and decimation means for receiving the decimated quadrature signal, and being coupled to the digital envelope detector means for receiving the composite channel signal;

phase error detector means for providing a predetermined trigonometric function of the phase error correction signal, the phase error detector means being coupled to the quadrature channel means for receiving the modified difference signal; and phase error estimator means coupled to the phase error detector means for providing the phase error correction signal in response to receiving and using the predetermined trigonometric function of the phase error correction signal.

2. The compatible quadrature modulated digital stereo receiver of claim 1 wherein the digital demodulation means further comprises:

a first multiplier having a first input for receiving the digital modulated input signal and a second input for receiving an in-phase component of the phase error correction signal, the first multiplier providing the in-phase signal; and a second multiplier having a first input for receiving the digital modulated input signal and a second input for receiving a quadrature component of the phase error correction signal, the second multiplier providing the quadrature signal.

3. The compatible quadrature modulated digital stereo receiver of claim 2 wherein the phase error estimator means further comprises:

a new phase error estimate generator coupled to the phase error detector means for receiving the predetermined trigonometric function of the phase error correction signal, the new phase error estimate generator providing the phase error correction signal; and a numerically controlled oscillator having an input for receiving the phase error correction signal, the numerically controlled oscillator being coupled to the first multiplier for providing the in-phase component of the phase error correction signal, and being coupled to the second multiplier for providing the quadrature component of the phase error correction signal.

4. The compatible quadrature modulated digital stereo receiver of claim 1 wherein the quadrature channel means further comprises:

a reciprocal cosine estimator having a first input for receiving the decimated in-phase signal and a second input for receiving the composite channel signal, the reciprocal cosine estimator providing a reciprocal cosine estimate signal, the reciprocal cosine estimate signal being equal to a reciprocal of a cosine value of a sum of the decimated quadrature signal and the phase error correction signal; and a quadrature channel manipulator having a first input for receiving the reciprocal cosine estimate signal and a second input for receiving the decimated quadrature signal, the quadrature channel manipulator providing the modified difference signal, the modified difference signal being equal to a product of the decimated quadrature signal and the reciprocal cosine estimate signal.

5. The quadrature channel means of claim 4 wherein the reciprocal cosine estimate signal is equal to a result of a division of the composite channel signal by the decimated in-phase.

6. The compatible quadrature modulated digital stereo receiver of claim 1 wherein the trigonometric function provided by the phase error detector is a tangent function.

7. The compatible quadrature modulated digital stereo receiver of claim 1 further comprises an arithmetic logic means for providing a left audio information signal and a right audio information signal, the arithmetic logic means having a first input coupled to the digital envelope detector means for receiving the composite channel signal and a second input coupled to the quadrature channel means for receiving the modified difference signal.

8. The compatible quadrature modulated digital stereo receiver of claim 7 wherein the arithmetic logic means further comprises:

an averager circuit coupled to the digital envelope detector for receiving the composite channel signal, the averager circuit averaging the composite channel signal to provide a carrier component of the composite channel signal;

a first adder having a first input coupled to the digital envelope detector means for receiving the composite channel signal and a second input coupled to the averager circuit for receiving the carrier component of the composite channel signal, the adder providing an intermediate signal with a value equal to a difference between the composite channel signal and the carrier component of the composite channel signal;

a high pass filter coupled to the quadrature channel means for receiving the modified difference signal, the high pass filter removing the phase error correction signal and providing a channel difference signal, the channels difference signal being equal to a difference between the left audio information signal and the right audio information signal;

a second adder having a first input coupled to the intermediate signal and a second input coupled to the channel difference signal, the second adder subtracting the channel difference signal from the intermediate signal to provide a right audio information signal; and a third adder having a first input coupled to the intermediate signal and a second input coupled to the channel difference signal, the third adder adding the intermediate signal and the channel difference signal to provide a left audio information signal.

9. In a data processing compatible quadrature modulated digital stereo receiver having circuitry for performing filtering, decimation, and predetermined arithmetic calculations, a method for providing a digital stereo signal, comprising the steps of:

digitally demodulating a digital modulated input signal with a phase error component to provide an in-phase signal and a quadrature signal;

providing a decimated in-phase signal by filtering and decimating the in-phase signal;

providing a decimated quadrature signal by filtering and decimating the quadrature signal;

providing a digital composite channel signal by using both the decimated in-phase signal and the decimated quadrature signal;

providing a digital modified difference signal with a phase error correction signal by using the decimated quadrature signal and the composite channel signal;

filtering and processing both the composite channel signal and the modified difference signal to provide a left audio component and a right audio component of the digital stereo signal;

filtering the modified difference signal to provide a predetermined trigonometric function of the phase error correction signal; and providing the phase error correction signal by using the predetermined trigonometric function of the phase error correction signal.

10. The method of claim 9 wherein the step of digitally demodulating a digital modulated input signal with a phase error component further comprises the steps of:

providing the in-phase component signal by multiplying the digital modulated input signal and an in-phase component of the phase error correction signal; and providing the quadrature signal by multiplying the digital modulated input signal and a quadrature component of the phase error correction signal.

11. The method of claim 10 wherein the step of providing the phase error correction signal further comprises the steps of:

providing the in-phase component of the phase error correction signal by using a first oscillating signal which has a frequency related to a phase of the phase error correction signal and a fraction of a carrier frequency and a center frequency of the phase error correction signal; and providing the quadrature component of the phase error correction signal by using a second oscillating signal which has a frequency related to a phase of the phase error correction signal and a fraction of a carrier frequency and a center frequency of the phase error correction signal.

12. The method of claim 9 wherein the step of providing the modified difference signal with the phase error correction signal further comprises the steps of:

providing a reciprocal cosine estimate signal by using the decimated in-phase and the composite channel signal; and providing the modified difference signal by using the reciprocal cosine estimate signal and the decimated quadrature signal.

13. The method of claim 12 wherein the step of providing the reciprocal cosine estimator comprises dividing the composite channel signal by the decimated in-phase signal.

14. The method of claim 12 wherein the step of providing the modified difference signal comprises multiplying the reciprocal cosine estimate signal and the decimated quadrature signal.

15. The method of claim 9 wherein the step of filtering the modified difference signal further comprises providing a tangent of the phase error correction signal.

16. The method of claim 9 wherein the step of providing a composite channel signal further comprises the steps of:

providing the decimated in-phase signal to a multipler to multiply the decimated in-phase signal by itself to provide a square of the decimated in-phase signal;

providing the decimated quadrature signal to the multiplier to multiply the decimated quadrature signal by itself to provide a square of the decimated quadrature signal;

providing the square of the decimated in-phase signal and the square of the decimated quadrature signal to an adder, the adder adding the square of the decimated in-phase signal to the square of the decimated quadrature signal to provide an intermediate envelope signal; and providing the intermediate envelope signal to circuitry which performs a square root of the intermediate envelope signal to provide the composite channel signal.

17. The method of claim 9 wherein the step of filtering and processing both the composite channel signal and the modified difference signal to provide a left audio component and a right audio component of a digital stereo output signal further comprises the steps of:

providing the composite channel signal to an averaging circuit to average the composite channel signal to provide a carrier power component of the composite channel signal;

providing the carrier power component to a first adder for subtracting the carrier power component of the composite channel signal from the composite channel signal to provide an intermediate information signal which contains the sum of the left audio component and the right audio component of the digital stereo signal;

filtering the modified channel difference signal to remove the phase error correction signal and provide a channel difference signal, the channel difference signal equal to the difference between the left audio component and the right audio component of the digital stereo signal;

coupling the intermediate information signal to a second adder for adding the intermediate information signal to the channel difference signal to produce the left audio component of the digital stereo signal; and coupling the channel difference signal to the first adder for subtracting the channel difference signal from the intermediate information signal to produce the right audio component of the digital stereo signal.

18. A compatible quadrature modulated digital stereo receiver, comprising:

a first multiplier having a first input for receiving a digital modulated input signal and a second input for receiving an in-phase component of a phase error correction signal, the first multiplier providing an in-phase component of the demodulated signal;

a second multiplier having a first input for receiving the digital modulated input signal and a second input for receiving a quadrature component of the phase error correction signal, the second multiplier providing a quadrature component of the demodulated signal;

a numerically controlled oscillator having an input for receiving the phase error correction signal, the numerically controlled oscillator coupled to the first multiplier for providing the in-phase component of the phase error correction signal and also coupled to the second multiplier for providing the quadrature component of the phase error correction signal;

a first filter and decimation means coupled to the first multiplier for receiving the in-phase component of the demodulated signal and providing an in-phase component of a decimated signal;

a second filter and decimation means coupled to the second multiplier for receiving the quadrature component of the demodulated signal and providing a quadrature component of the decimated signal;

digital envelope detector means for providing a composite channel signal, the digital envelope detector means having a first input for receiving the in-phase component of the decimated signal and a second input for receiving the quadrature component of the decimated signal;

a reciprocal cosine estimator having a first input coupled to the first filter and decimation means for receiving the in-phase component of the decimated signal and a second input coupled to the composite channel signal, the reciprocal cosine estimator providing a reciprocal cosine estimate signal;

a quadrature channel manipulator having a first input coupled to the reciprocal cosine estimator for receiving the reciprocal cosine estimate signal and a second input coupled to the second filter and decimation means for receiving the quadrature component of the decimated signal, the quadrature channel manipulator providing a modified channel difference signal containing the quadrature component of the decimated signal and the phase error correction signal;

phase error detector means for providing a predetermined trigonometric function of the phase error correction signal including an in-phase component and a quadrature component, the phase error detector means being coupled to the quadrature channel means for receiving the modified difference signal; and phase error estimator means coupled to the phase error detector means for providing the phase error correction signal in response to the predetermined trigonometric function of the phase error correction signal.

19. The compatible quadrature modulated digital stereo receiver of claim 18 wherein the trigonometric function provided by the phase error detector is a tangent function.

20. The compatible quadrature modulated digital stereo receiver of claim 18 wherein the reciprocal cosine estimate signal is equal to a division of the composite channel signal by the in-phase component of the decimated signal.

* * * * *